United States Patent
Gupta et al.

(10) Patent No.: US 12,409,875 B2
(45) Date of Patent: Sep. 9, 2025

(54) PROVIDING A VIRTUAL RAILROAD CROSSING WARNING

(71) Applicant: Toyota Motor Engineering & Manufacturing North America, Inc., Plano, TX (US)

(72) Inventors: Rohit Gupta, Santa Clara, CA (US); Benjamin Piya Austin, Saline, MI (US); William Patrick Garrett, Plymouth, MI (US); Philip J. Babian, Canton, MI (US)

(73) Assignees: Toyota Motor Engineering & Manufacturing North America, Inc., Plano, TX (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 0 days.

(21) Appl. No.: 18/512,972

(22) Filed: Nov. 17, 2023

(65) Prior Publication Data
US 2025/0162630 A1    May 22, 2025

(51) Int. Cl.
*B61L 29/32*    (2006.01)
*B60T 7/12*    (2006.01)

(52) U.S. Cl.
CPC ............... *B61L 29/32* (2013.01); *B60T 7/12* (2013.01)

(58) Field of Classification Search
CPC .................................. B61L 29/32; B60T 7/12
See application file for complete search history.

(56) References Cited

U.S. PATENT DOCUMENTS

| | | | |
|---|---|---|---|
| 6,450,587 B1 * | 9/2002 | MacGregor | B60T 17/16 |
| 9,688,297 B2 | 6/2017 | Ryan | |
| 9,930,120 B2 | 3/2018 | Gutierrez | |
| 10,322,675 B2 | 6/2019 | Naboulsi | |
| 10,839,680 B2 | 11/2020 | Kawabe et al. | |

(Continued)

FOREIGN PATENT DOCUMENTS

| | | |
|---|---|---|
| CN | 109367588 B | 8/2020 |
| JP | 2001328535 A | 11/2005 |

(Continued)

OTHER PUBLICATIONS

Boufidis et al, "Estimating time of arrival of trains at level crossings for the provision of multimodal cooperative services", Sep. 2019, Barcelona, Spain.

*Primary Examiner* — Joseph J Dallo
(74) *Attorney, Agent, or Firm* — Christopher G. Darrow; Darrow Mustafa PC

(57) ABSTRACT

Systems, methods, and other embodiments described herein relate to improving the communication of a railroad crossing warning. In one embodiment, a method includes identifying a railroad crossing in a path of a road user. The method further includes in response to determining that a train is approaching the road user at the railroad crossing, determining whether a warning mechanism of the railroad crossing satisfies a crossing threshold that is based, at least in part, on a safety condition of the warning mechanism. Moreover, the method includes controlling a display of the road user to output a virtual railroad crossing bar on the display according to the safety condition responsive to determining that the warning mechanism satisfies the crossing threshold.

20 Claims, 4 Drawing Sheets

(56) References Cited

U.S. PATENT DOCUMENTS

| | | | |
|---|---|---|---|
| 10,976,748 B2 | 4/2021 | Silver et al. | |
| 2013/0194423 A1 | 8/2013 | Baines et al. | |
| 2016/0091315 A1* | 3/2016 | Oguri ..................... | G01S 19/40 |
| | | | 701/408 |
| 2017/0267265 A1* | 9/2017 | Bartolotti ................ | B61L 29/32 |
| 2019/0143893 A1 | 5/2019 | Hyuga et al. | |
| 2019/0163176 A1* | 5/2019 | Wang .................... | G05D 1/0088 |
| 2022/0130296 A1 | 4/2022 | Kamiya et al. | |
| 2023/0166743 A1* | 6/2023 | Heck ..................... | B60W 30/09 |

FOREIGN PATENT DOCUMENTS

| | | | | |
|---|---|---|---|---|
| JP | 2012096705 A | | 1/2015 | |
| JP | 2023117211 A | | 8/2023 | |
| JP | 2023145508 A | * | 10/2023 | |
| KR | 20050034022 A | | 4/2005 | |
| KR | 20080004756 A | | 1/2008 | |
| KR | 102420766 B1 | | 7/2022 | |
| WO | WO-2020235031 A1 | * | 11/2020 | ............... B60Q 9/00 |

\* cited by examiner

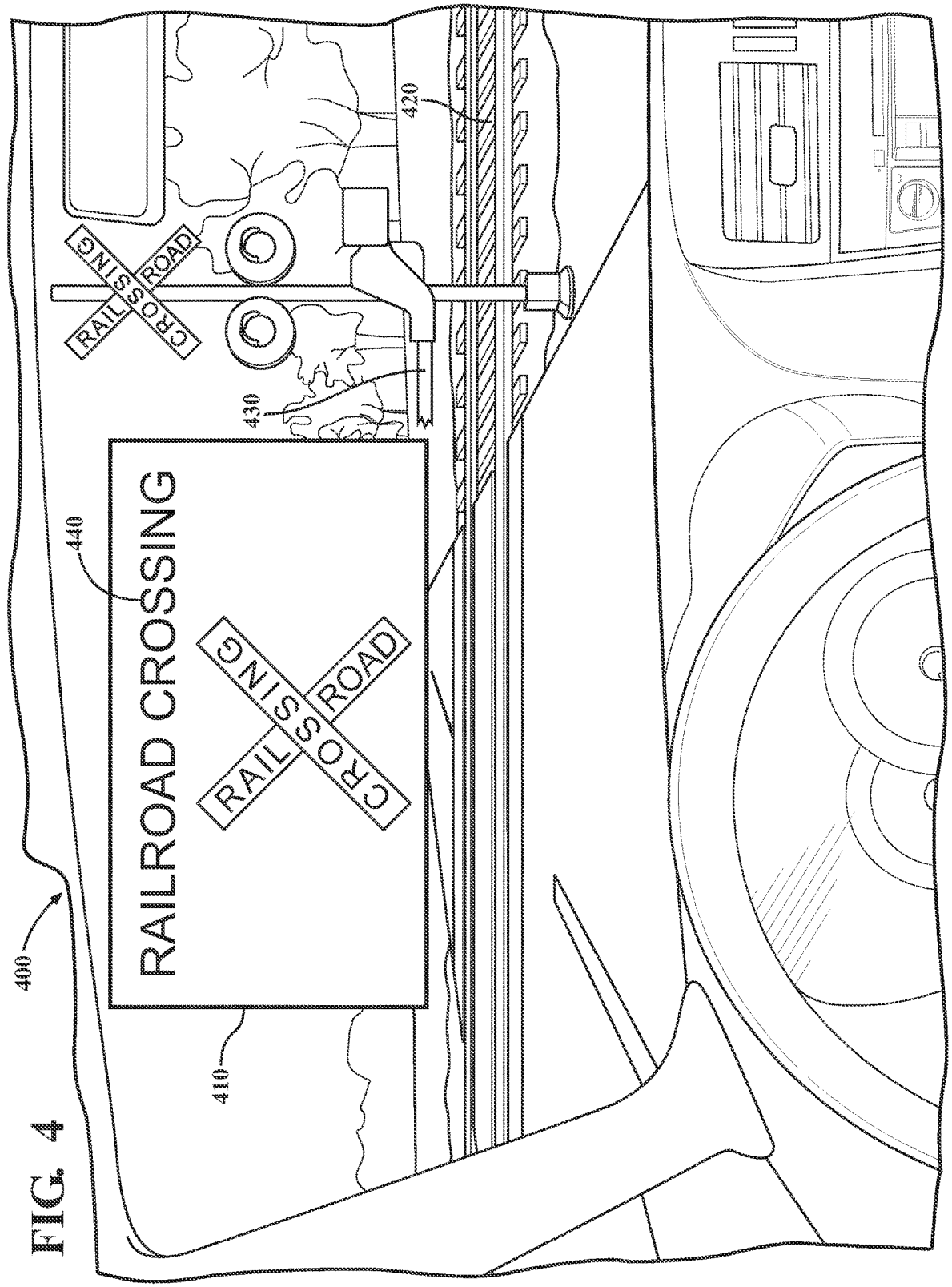

PROVIDING A VIRTUAL RAILROAD CROSSING WARNING

TECHNICAL FIELD

The subject matter described herein relates, in general, to improving the communication of a railroad crossing warning, and, more particularly, to providing a virtual railroad crossing warning for road users.

BACKGROUND

Railroad crossings pose dangers to vehicles, pedestrians, and other road users that travel over railroad crossings. Physical protection measures, such as railroad crossing bars, flashing lights, and other barriers, are used to warn road users of approaching trains at railroad crossings and to block road users from entering the railroad crossing. However, these physical protection measures are not always seen by road users depending on the size and location of the physical protection measures in relation to the road user and railroad crossing. As an example, some railroad crossing bars may be small (e.g., not extending far enough to block a road user from entering the railroad crossing) or located in an unnoticeable area along the railroad crossing (e.g., located along a curved portion of the railroad crossing, behind an obstacle, etc.). Further, road users are not always attentive when approaching railroad crossings. For example, road users may be distracted by navigation instructions, mobile devices, other road users, etc., when approaching railroad crossings. As such, distracted road users can easily ignore physical protection measures and enter a railroad crossing, which can lead to collisions, injuries, death, traffic delays, etc.

Moreover, many railroad crossings, such as railroad crossings in rural environments, do not have physical protection measures or warning mechanisms. As such, road users are left to their best judgment in deciding when it is safe to cross a railroad crossing. If a road user misjudges the intentions of an approaching train, the road user can be hit by the train. Additionally, even when railroad crossings have warning mechanisms and physical protection measures, these mechanisms/measures can become damaged, broken, etc., over time, which can result in the mechanisms/measures malfunctioning or failing to function at all. Accordingly, if a road user is unaware of a dysfunctional state of a warning mechanism at a railroad crossing, the road user may assume that the warning mechanism is functioning properly and rely on the warning mechanism. If the road user relies on a dysfunctional warning mechanism, the road user may be exposed to unsafe conditions, such as an unavoidable train in the path of the road user.

SUMMARY

In one embodiment, example systems and methods relate to a manner of providing a virtual railroad crossing warning to a road user. As previously discussed, railroad crossings may not use sufficient warning mechanisms to keep road users safe at railroad crossings. For example, railroad crossings may not use warning mechanisms, may use broken/dysfunctional warning mechanisms, may use warning mechanisms that go unnoticed by road users, etc. Failure to provide a warning mechanism that invokes a road user to stop before entering a railroad crossing can result in property damage, collision, injury, and death.

Therefore, in one embodiment, a system that improves the safety of road users at railroad crossings is disclosed. The road user is, for example, a vehicle, pedestrian, bicyclist, or any other road user that can travel over railroad tracks. In one aspect, the system is implemented in different forms, such as within a vehicle or mobile device (e.g., a smartphone). The system is generally configured to monitor a path the road user is traversing to identify an upcoming railroad crossing in the path of the road user. The system acquires information about whether a train is approaching the railroad crossing from, for example, a server that includes train schedules and/or from sensors that observe the surrounding environment and provide, for example, detections of vibrations and noise associated with an approaching train. In any case, when a train is approaching the path of the road user, the system determines whether warning mechanisms of the railroad crossing, such as railroad crossing bars, are sufficient/available to warn the road user of the approaching train.

The system identifies, in one arrangement, the state of the warning mechanism using sensors of the road user, accident history associated with the railroad crossing, the eye and head position of the road user, and so on. If, for example, there is no warning mechanism, the warning mechanism is broken/malfunctioning, the warning mechanism is occluded, the warning mechanism is not seen by the road user, or the conditions otherwise indicate that it would be beneficial to provide the road user with an additional warning, the system controls a display of the road user to output a virtual railroad crossing bar. The display may be an augmented reality (AR) display on the windshield/window of a vehicle or a screen of a mobile device carried by the road user. The virtual railroad crossing bar can be static or dynamic, where a dynamic virtual railroad crossing bar can mimic the movements of a physical railroad crossing bar. Additionally, the road user may receive haptic or audible notifications relating to the presence of the approaching train. In any case, the virtual railroad crossing bar is presented in a manner that catches the attention of the road user. In this way, the system improves a railroad crossing warning to a road user.

In one embodiment, a safety system is disclosed. The system includes one or more processors and a memory communicably coupled to the one or more processors. The memory storing instructions that, when executed by the one or more processors, cause the one or more processors to identify a railroad crossing in a path of a road user. The instructions further include instructions to responsive to determining that a train is approaching the road user at the railroad crossing, determine whether a warning mechanism of the railroad crossing satisfies a crossing threshold that is based, at least in part, on a safety condition of the warning mechanism. Moreover, the instructions include instructions to control a display of the road user to output a virtual railroad crossing bar on the display according to the safety condition responsive to determining that the warning mechanism satisfies the crossing threshold.

In one embodiment, a non-transitory computer-readable medium and including instructions that when executed by one or more processors cause the one or more processors to perform one or more functions is disclosed. The instructions include instructions to identify a railroad crossing in a path of a road user. The instructions further include instructions to responsive to determining that a train is approaching the road user at the railroad crossing, determine whether a warning mechanism of the railroad crossing satisfies a crossing threshold that is based, at least in part, on a safety condition of the warning mechanism. Moreover, the instructions include instructions to control a display of the road user to output a virtual railroad crossing bar on the display according to the safety condition responsive to determining that the warning mechanism satisfies the crossing threshold.

In one embodiment, a method is disclosed. In one embodiment, the method includes identifying a railroad crossing in a path of a road user. The method further includes in response to determining that a train is approaching the road user at the railroad crossing, determining whether a warning mechanism of the railroad crossing satisfies a crossing threshold that is based, at least in part, on a safety condition of the warning mechanism. Moreover, the method includes controlling a display of the road user to output a virtual railroad crossing bar on the display according to the safety condition responsive to determining that the warning mechanism satisfies the crossing threshold.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 4 illustrates an illustrative example of a virtual railroad crossing warning provided on a display of a vehicle.

DETAILED DESCRIPTION

Figure 1:
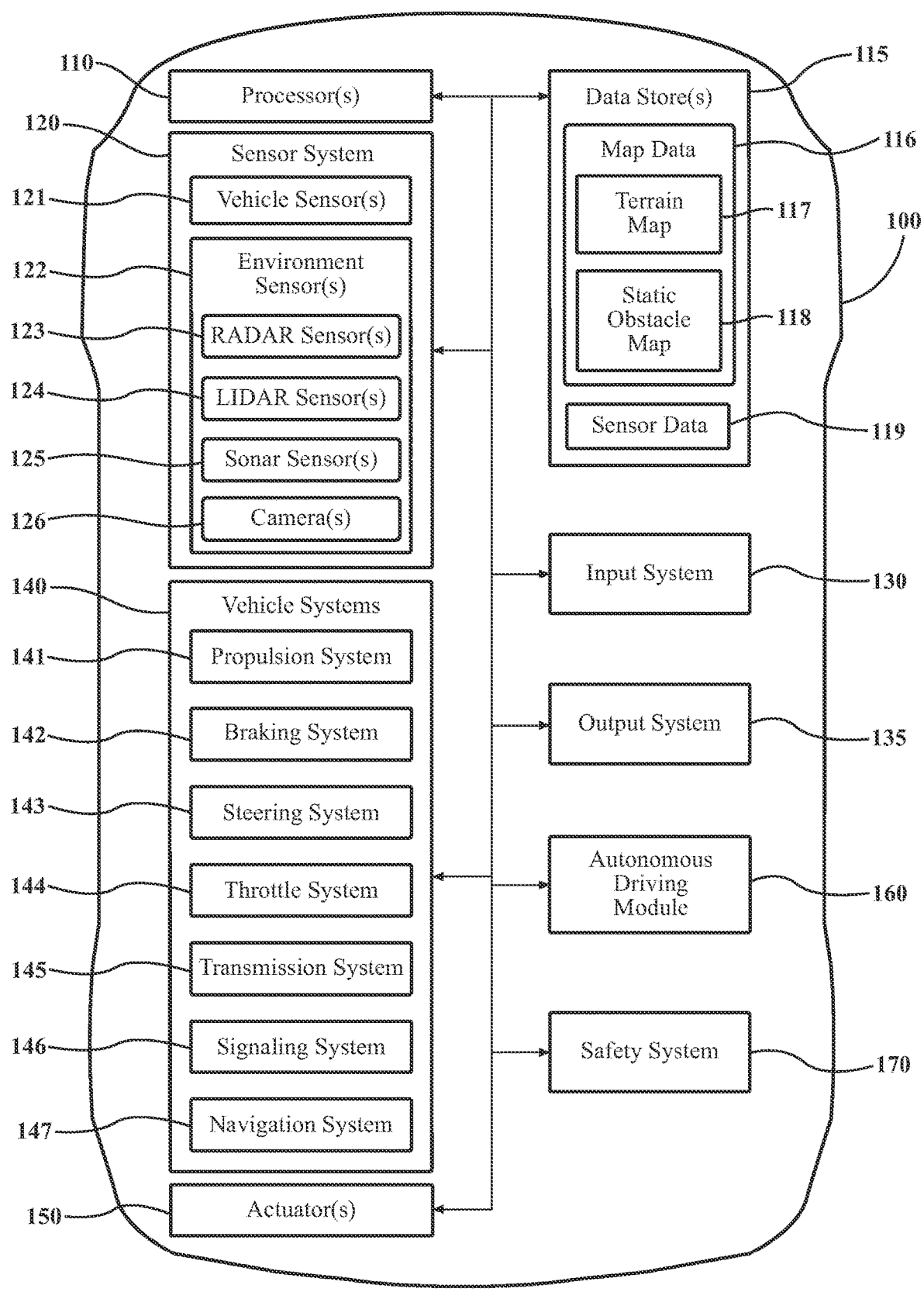
FIG. 1 illustrates one embodiment of a vehicle within which systems and methods disclosed herein may be implemented.

Systems, methods, and other embodiments associated with improving the provision of railroad crossing warnings to road users are disclosed herein. As previously discussed, railroad crossings may not use sufficient warning mechanisms to keep road users from entering a railroad crossing at an unsafe time. For example, railroad crossings may not have warning mechanisms present, may use broken/dysfunctional warning mechanisms, may use warning mechanisms that go unnoticed by road users, etc. Failure to stop a road user from entering a railroad crossing can lead to unsafe conditions, such as collisions, injuries, and traffic delays.

Therefore, in one embodiment, a system that improves the safety of road users at railroad crossings is disclosed. The road user is, for example, a vehicle, pedestrian, bicyclist, or any other road user that can travel over railroad tracks. In one aspect, the system is implemented in different forms, such as within a vehicle or mobile device (e.g., a smartphone), where the system can provide railroad crossing warnings both to drivers of a vehicle as well as pedestrians. The system is generally configured to monitor a path the road user is traversing to identify an upcoming railroad crossing in the path of the road user. In one approach, the system monitors the path of the road user using navigation/global position system (GPS) data associated with the road user and/or by utilizing sensors that inform the system about the environment of the road user.

Responsive to determining that the road user is approaching a railroad crossing, the system acquires information about whether a train is approaching the railroad crossing. For example, the system may acquire train schedules associated with the railroad crossing from a server. Additionally, the system may determine that a train is approaching from, for example, detections of vibrations and noise associated with an approaching train. To avoid interactions with the train (e.g., potential collisions, traffic delays caused by the train, etc.), the system may provide the road user with navigation instructions/automatically reroute the road user to avoid the train. However, where interactions with an approaching train are difficult or inconvenient to avoid, the system determines whether warning mechanisms of the railroad crossing, such as railroad crossing bars, are sufficient/available to warn the road user of the approaching train.

The system, in one arrangement, identifies the state of the warning mechanism using sensors of the road user. For example, the system may identify whether a warning mechanism is present at the railroad crossing based on image/video data acquired by a device of the road user. If the sensor data indicates that a warning mechanism is not present and/or is not within close proximity to the road user, the system determines that the warning mechanism is unsafe. Additionally, the system may identify whether the warning mechanism is functioning using the sensors. A functioning warning mechanism is, for example, a warning mechanism that can execute dynamic movements (e.g., a crossing bar that can move between a deployed and retracted position) and/or a warning mechanism that can output warnings (e.g., a crossing bar that can flash lights). As an example, if a train is approaching the road user and a warning mechanism is in the vicinity of the railroad crossing but is not activating (e.g., not performing dynamic movements, not outputting audio/visual warnings, etc.), the system determines that the warning mechanism is dysfunctional and, therefore, unsafe. The system may also identify the state of the warning mechanism using accident history and/or user reports acquired from a server. Based on the frequency of accidents and/or frequency of reports indicating an unsafe condition at the railroad crossing, the system can determine whether the warning mechanism is capable of successfully providing a warning to the road user. For example, if there have been twenty accidents at the railroad crossing caused by a road user colliding with a train within the last month, the system determines that the warning mechanism is unsafe. In one arrangement, reports are generated via user inputs entered on a mobile phone (e.g., via a phone application).

Further, the system may identify whether the warning mechanism is capable of warning a road user using the head and eye position of the road user as the road user approaches the railroad crossing. The system may identify that, based on the gaze of the road user, the warning mechanism is outside of the field of view (FOV) of the road user. For example, although a warning mechanism may be present and functioning properly, the road user may not see the warning mechanism due to the road user looking at a smartphone or otherwise diverting their attention away from the warning mechanism. Accordingly, the warning mechanism may be deemed unsafe when the warning mechanism does not attract the attention of an approaching road user.

If, for example, there is no warning mechanism, the warning mechanism is broken/malfunctioning, the warning mechanism is occluded, and/or the warning mechanism is not seen by the road user, the system controls a display of the road user to output a virtual railroad crossing bar. Additionally, even when the warning mechanism is present, functioning properly, and within the FOV of the road user, the system can still provide the virtual railroad crossing bar to the road user as a supplemental warning. In one approach, the system provides the warning mechanism as a supplemental warning when the system determines that the road user frequently travels over the upcoming railroad crossing. As an example, road users who frequently traverse a railroad crossing may approach the familiar railroad crossing with a lesser degree of attentiveness than road users who have not previously traversed the railroad crossing. Accordingly, if, due to the frequency of use, the system determines that the road user is unlikely to take all necessary precautions to respect an existing warning mechanism, then the system provides the road user with a virtual railroad crossing bar on a device of the road user.

The display may be an augmented reality (AR) display on the windshield/window of a vehicle or a screen of a mobile device carried by the road user. The system determines when to output the virtual railroad crossing bar based on a variety of factors, such as the speed and behavior of the road user as the road user approaches the railroad crossing. For example, if the road user is approaching the railroad crossing at a high speed, accelerating as they come closer to the railroad crossing, or otherwise appear to be approaching the railroad crossing with no intention to slow down, the system outputs the warning at an earlier time than if the road user is slowly approaching the railroad crossing or slowing down as they approach the railroad crossing.

The virtual railroad crossing bar can be static or dynamic, where a dynamic virtual railroad crossing bar can mimic the movements of a physical railroad crossing bar. The system can also vary the appearance of the virtual railroad crossing bar (e.g., by changing the brightness, flash rate, and/or color of the virtual railroad crossing bar as it is presented to the road user) to maintain the gaze of the road user. For example, the system can track the eye position of the road user as the road user waits to cross the railroad crossing. If the system determines that the road user is losing focus with respect to the virtual railroad crossing bar, then the system varies the virtual railroad crossing bar in a way that regains the gaze and attention of the road user. Additionally, the road user may receive haptic or audible notifications relating to the presence of the approaching train. In any case, the virtual railroad crossing bar is presented in a manner that catches the attention of the road user. In this way, the system improves a railroad crossing warning to a road user.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with identifying railroad crossings and providing warnings related to upcoming railroad crossings in the path of the vehicle 100. As a further note, although arrangements will be described herein with respect to the vehicle 100, it should be understood that the functionalities described herein may be implemented in other devices, such as within a mobile device (e.g., mobile phone, smartphone, and so on) of a road user (e.g., a pedestrian, cyclist, runner, etc.) that includes sensors to perceive aspects of the surrounding environment.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a safety system 170 that is implemented to perform methods and other functions as disclosed herein relating to improving the safety of road users at a railroad crossing.

Figure 2:
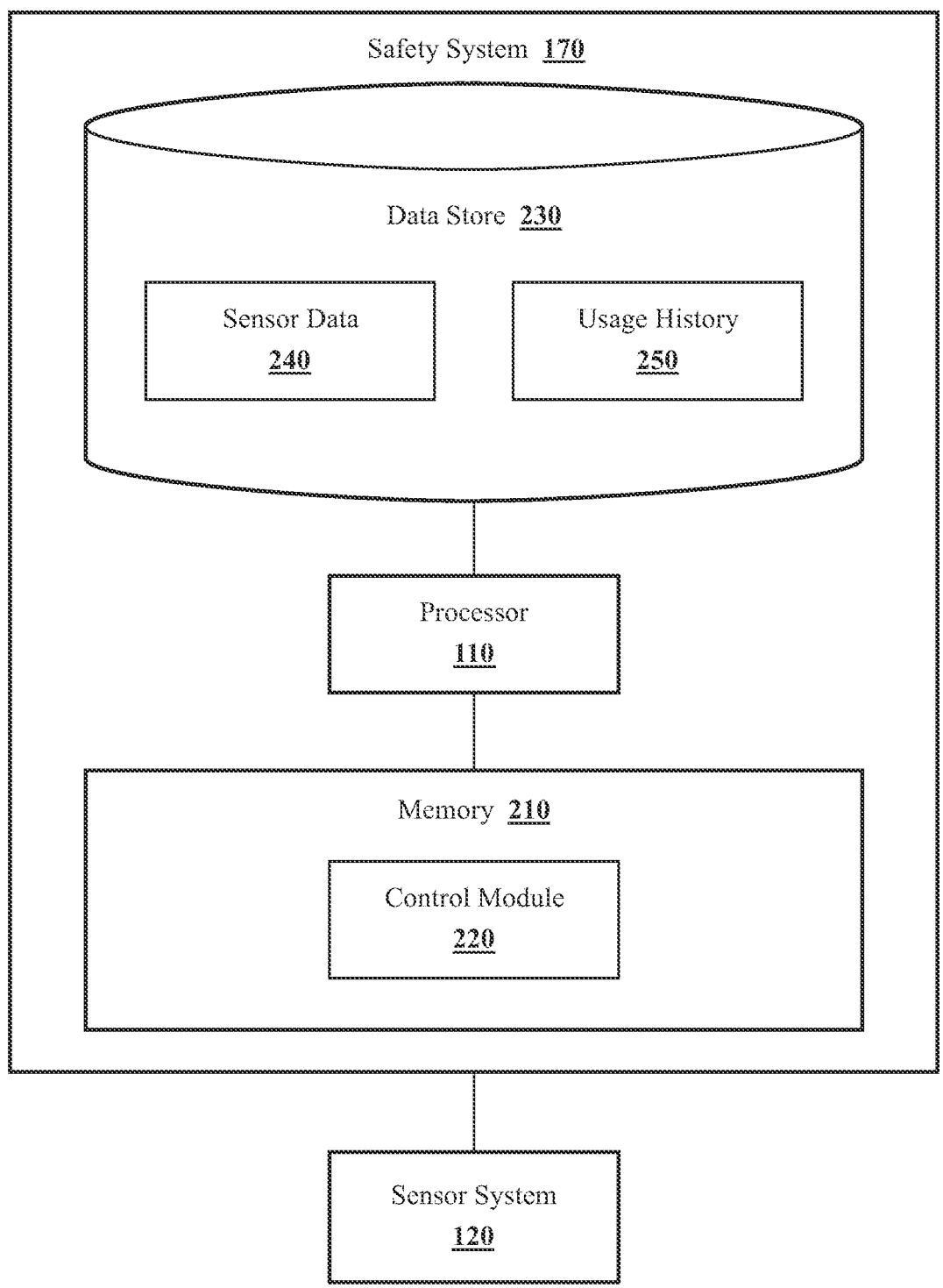
FIG. 2 illustrates one embodiment of a safety system that is associated with improving the communication of a railroad crossing warning to a road user.

With reference to FIG. 2, one embodiment of the safety system 170 of FIG. 1 is further illustrated. The safety system 170 is shown as including a processor 110 from the vehicle 100 of FIG. 1. Accordingly, the processor 110 may be a part of the safety system 170, the safety system 170 may include a separate processor from the processor 110 of the vehicle 100, or the safety system 170 may access the processor 110 through a data bus or another communication path. In one embodiment, the safety system 170 includes a memory 210 that stores a control module 220. The memory 210 is a random-access memory (RAM), read-only memory (ROM), a hard-disk drive, a flash memory, or other suitable memory for storing the control module 220. The control module 220 is, for example, computer-readable instructions that when executed by the processor 110 cause the processor 110 to perform the various functions disclosed herein.

The control module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the control module 220, in one embodiment, acquires sensor data 240 that includes at least camera images. In further arrangements, the control module 220 acquires the sensor data 240 from further sensors such as a radar 123, a LIDAR 124, one or more microphones of the vehicle 100, piezoelectric sensors, accelerometers, and other sensors as may be suitable for identifying railroad crossings, warning mechanisms of railroad crossings, and approaching trains.

Accordingly, the control module 220, in one embodiment, controls the respective sensors to provide the data inputs in the form of the sensor data 240. Additionally, while the control module 220 is discussed as controlling the various sensors to provide the sensor data 240, in one or more embodiments, the control module 220 can employ other techniques to acquire the sensor data 240 that are either active or passive. For example, the control module 220 may passively sniff the sensor data 240 from a stream of electronic information provided by the various sensors to further components within the vehicle 100. Moreover, the control module 220 can undertake various approaches to fuse data from multiple sensors when providing the sensor data 240 and/or from sensor data acquired over a wireless communication link. Thus, the sensor data 240, in one embodiment, represents a combination of perceptions acquired from multiple sensors.

In addition to locations of surrounding railroad crossings, railroad crossing warning mechanisms, and trains, the sensor data 240 may also include, for example, information about a driver of the vehicle 100. In one embodiment, the control module 220 controls sensors of the vehicle 100, such as cameras, that monitor eye and head movements (i.e., the gaze) of the road user to acquire the sensor data 240 about the driver. Moreover, the control module 220, in one embodiment, controls the sensors to acquire the sensor data 240 about an area that encompasses 360 degrees about the vehicle 100 in order to provide a comprehensive assessment of the surrounding environment. Of course, in alternative embodiments, the control module 220 may acquire the sensor data about a forward direction alone when, for example, the vehicle 100 is not equipped with further sensors to include additional regions about the vehicle and/or the additional regions are not scanned due to other reasons.

Moreover, in one embodiment, the safety system 170 includes a data store 230. In one embodiment, the data store 230 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 230 stores data used by the control module 220 in executing various functions. In one embodiment, the data store 230 further includes usage history 250 that includes data relating to the usage history of railroad crossing by the vehicle 100. For example, the usage history 250 may include which railroad crossings the vehicle 100 has previously traversed and a frequency of usage at the railroad crossings by the vehicle 100.

The control module 220, in one embodiment, is further configured to perform additional tasks beyond controlling the respective sensors to acquire and provide the sensor data 240. For example, the control module 220 includes instructions that cause the processor 110 to analyze the sensor data 240 to identify a railroad crossing in the path of the vehicle 100. In one embodiment, the control module 220 identifies a railroad crossing in the path of the vehicle 100 based on GPS/map data associated with the environment and upcoming path of the vehicle 100. For example, map data used by the vehicle 100 may include the location of railroad crossings.

In addition to GPS/map data, in one approach, the control module 220 identifies a railroad crossing by processing image/video data acquired by the sensors of the vehicle 100 to identify characteristics in the environment of the vehicle 100 that are indicative of a railroad crossing, such as railroad tracks, warning mechanisms (e.g., railroad crossing bars, railroad crossing signs, and so on). Beyond identifying railroad crossings in the path of the vehicle 100, the control module 220, in one configuration, identifies warning mechanisms and the state of warning mechanisms at railroad crossings. For example, the control module 220 may process image/video data acquired by the vehicle 100 to identify characteristics about warning mechanisms of railroad crossings.

In one approach, the control module 220 uses a machine learning algorithm embedded within the control module 220, such as a convolutional neural network (CNN), to perform feature extraction over the sensor data 240 from which further information is derived. Of course, in further aspects, the control module 220 may employ different machine learning algorithms or implements different approaches for performing the associated functions, which can include deep convolutional encoder-decoder architectures, or another suitable approach that identifies railroad crossings and warning mechanisms in image/video data. Whichever particular approach the control module 220 implements, the control module 220 provides an output identifying objects represented in the sensor data 240. In this way, the control module 220 identifies the presence of railroad crossings and warning mechanisms in the surroundings of the vehicle 100 from the sensor data 240.

Accordingly, the control module 220 correlates identified characteristics in the environment of the vehicle 100 to identify railroad crossings and warning mechanisms of railroad crossings. Characteristics about warning mechanisms at railroad crossings can include the location of the warning mechanism in relation to the railroad crossing and the vehicle 100 and the state of the warning mechanism (e.g., whether the warning mechanism is damaged, outputting a warning, occluded, etc.).

Responsive to identifying a railroad crossing in the path of the vehicle 100, the control module 220, in one embodiment, determines whether a train is approaching the vehicle 100 at the railroad crossing. In one approach, the control module 220 determines that a train is approaching by acquiring a train schedule from a remote server or network that the vehicle 100 wirelessly connects to. A train schedule is, for example, a schedule that informs the control module 220 of an expected time of arrival of a train at the railroad crossing in the path of the vehicle 100. In one embodiment, the control module 220 determines that a train is approaching by detecting vibrations and noise associated with an approaching train. For example, the control module 220 may acquire vibration and noise data from microphones of the vehicle 100, piezoelectric sensors, accelerometers, and/or any other sensors suitable for acquiring vibration data.

In response to determining that a train is approaching the path of the vehicle 100, the control module 220, in one approach, determines whether alternate routes exist that would allow the vehicle 100 to avoid the train without excessive delays (e.g., without delays that exceed two minutes, five minutes, ten minutes, etc.). In one embodiment, the control module 220 determines that alternate routes exist by analyzing map data associated with the surroundings of the vehicle 100, where the map data is acquired by a navigation/GPS device of the and/or from a remote server/network that the vehicle 100 wirelessly connects to. In considering whether an alternate route that does not cause excessive delays exists, the control module 220 analyzes the approaching train data to determine the speed of the train, the amount of time the train is expected to take while traversing the railroad crossing, and other relevant information pertaining to the train. If, for example, the train is expected to stay at the railroad crossing for less than a threshold amount of time (e.g., less than five minutes, two minutes, etc.), the control module 220 does not reroute the vehicle 100. If, on the other hand, the train is expected to stay at the railroad crossing for more than a threshold amount of time (e.g., more than two minutes, more than five minutes, or other amounts of time that would cause the vehicle 100 to be delayed from reaching a destination), the control module 220 reroutes the vehicle 100 and/or provides navigation instructions for the vehicle 100 to execute that would result in the vehicle 100 avoiding the train.

In one embodiment, if the control module 220 determines that a train is approaching the vehicle 100 and is unable to find alternate routes for the vehicle 100 to avoid the approaching train, the control module 220 determines whether the warning mechanism of the railroad crossing satisfies a crossing threshold that is based, at least in part, on a safety condition of the warning mechanism. The safety condition of the warning mechanism includes, in one embodiment, an availability of the warning mechanism (i.e., whether the warning mechanism is present at the railroad crossing), a visibility of the warning mechanism (i.e., whether the warning mechanism is occluded and/or within the FOV of the driver of the vehicle 100), and/or a functionality of the warning mechanism (i.e., whether the warning mechanism is functioning properly and outputting warning). Further, the safety condition may include an accident history associated with the railroad crossing as well as the usage history 250 associated with the railroad crossing.

In any case, when the warning mechanism satisfies the crossing threshold, the control module 220, in one embodiment, controls a display of the vehicle 100 to output a virtual railroad crossing bar on the display. The display is, for example, a heads up display (HUD), virtual reality (VR) display, augmented reality (AR) display, dashboard display, or other display of the vehicle 100. The virtual railroad crossing bar is output as a static or dynamic graphic on the display, where the color, brightness, flash rate, movements, and/or location of the virtual railroad crossing bar are variable. Where the virtual railroad crossing bar is a dynamic graphic, the virtual railroad crossing bar, in one approach, mimics the movements of a physical railroad crossing bar by, for example, raising and lowering in a manner similar to a physical railroad crossing bar.

Additionally, in one approach, the control module 220 controls the display of the vehicle 100 to output the virtual railroad crossing bar on the display regardless of the safety condition of the warning mechanism. For example, the control module 220 may provide the virtual railroad crossing bar as a supplemental warning to the driver of the vehicle 100 to enhance safety of the vehicle 100 near the railroad crossing. In this way, the safety system 170 improves the safety of road users at a railroad crossing by providing virtual railroad crossing bar warnings to the road user.

Figure 3:
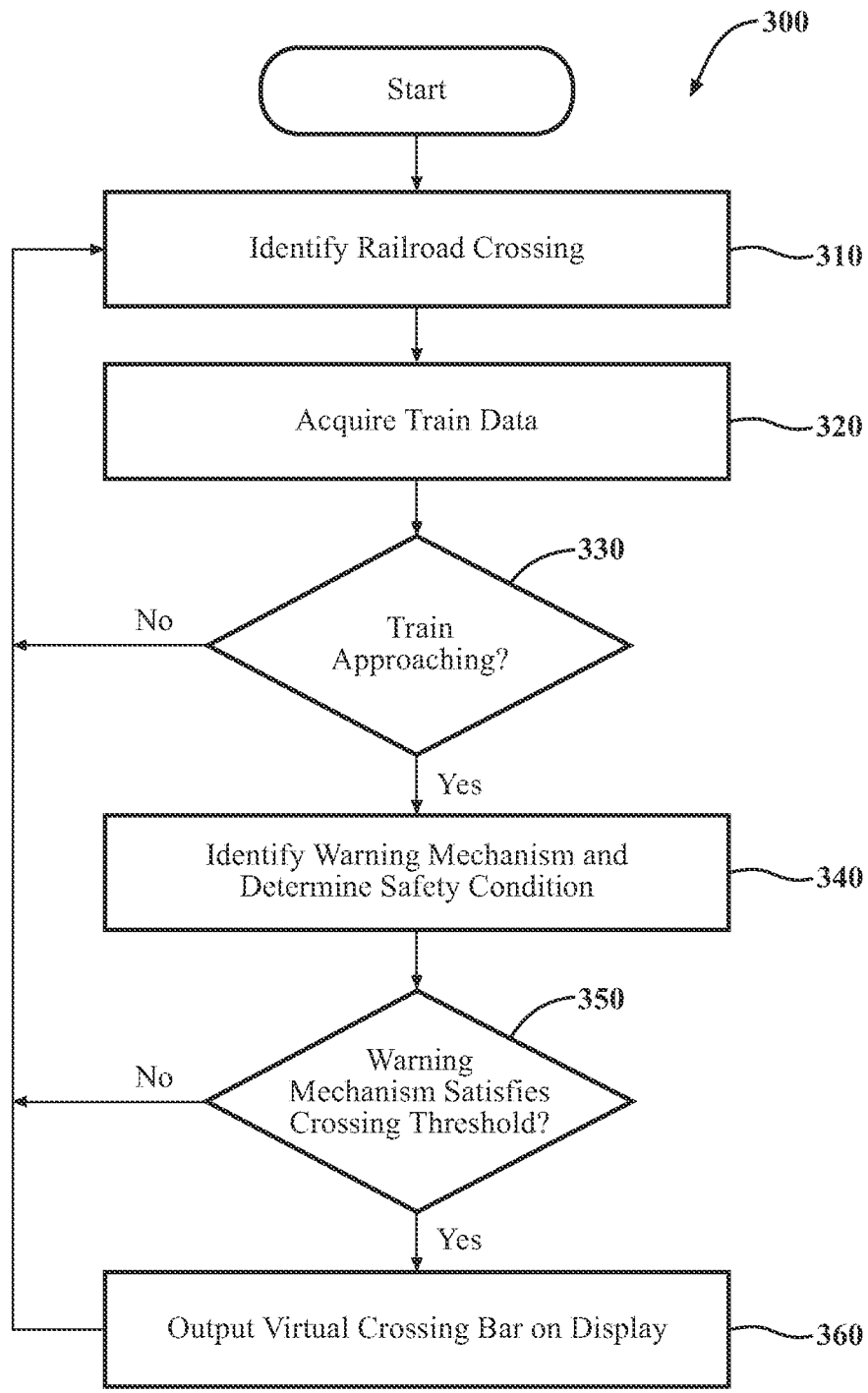
FIG. 3 illustrates one embodiment of a method that is associated with providing a virtual railroad crossing warning to a road user.

Additional aspects of improving railroad crossing warnings will be discussed in relation to FIG. 3. FIG. 3 illustrates a flowchart of a method 300 that is associated with providing a railroad crossing warning to a road user. Method 300 will be discussed from the perspective of the safety system 170 of FIGS. 1, and 2. While method 300 is discussed in combination with the safety system 170, it should be appreciated that the method 300 is not limited to being implemented within the safety system 170 but is instead one example of a system that may implement the method 300.

At 310, the control module 220 identifies a railroad crossing in the path of the vehicle 100. To identify the railroad crossing, the control module 220 controls the sensor system 120 to acquire the sensor data 240. As part of controlling the sensors to acquire the sensor data 240, it is generally understood that the sensors acquire the sensor data 240 of a region around the vehicle 100 with data acquired from different types of sensors generally overlapping in order to provide for a comprehensive sampling of the surrounding environment at each time step. The sensor data 240 of the region around the vehicle could include data related to occupants of the vehicle 100, data related to the vehicle 100 itself, and/or data related to railroad crossings and railroad crossing warning mechanisms in the surroundings of the vehicle 100. In general, the sensor data 240 need not be of the exact same bounded region in the surrounding environment but should include a sufficient area of overlap such that distinct aspects of the area can be correlated. Thus, the control module 220, in one embodiment, controls the sensors to acquire the sensor data 240 of the surrounding environment.

Moreover, in further embodiments, the control module 220 controls the sensors to acquire the sensor data 240 at successive iterations or time steps. Thus, the safety system 170, in one embodiment, iteratively executes the functions discussed at blocks 410-420 to acquire the sensor data 240 and provide information therefrom. Furthermore, the control module 220, in one embodiment, executes one or more of the noted functions in parallel for separate observations in order to maintain updated perceptions. Additionally, as previously noted, the control module 220, when acquiring data from multiple sensors, fuses the data together to form the sensor data 240 and to provide for improved determinations of detection, location, and so on.

In any case, the control module 220, in one approach, processes the sensor data 240 to identify a railroad crossing in the path of the vehicle 100. For example, the control module 220 may employ a machine learning model to extract features about the environment surrounding the vehicle 100 in order to identify the railroad crossing from image/video data. In addition to or instead of analyzing image/video data, in one embodiment, the control module 220 identifies the railroad crossing using map/navigation/GPS data. In one configuration, the control module 220 identifies a railroad crossing in the path of the vehicle 100 based on GPS/map data associated with the environment and upcoming path of the vehicle 100. As an example, the control module 220 can identify a railroad crossing by analyzing map data of the vehicle 100 that includes the location of railroad crossings.

At 320, the control module 220 acquires train data associated with trains that traverse the railroad crossing. In one approach, the train data includes a train schedule, where the control module 220 acquires the train schedule from a remote server or network. The trains schedule includes, for example, the expected time of arrival of the train at the road crossing, the speed of the train, the direction of travel of the train, and so on. The control module 220, in one arrangement, acquires the train data from sensors of the vehicle 100. In one arrangement, the control module 220 controls the sensors to acquire vibration/noise data and/or image/video data associated with the railroad crossing.

At 330, the control module 220 determines whether a train is approaching the vehicle 100 at the road crossing. In one embodiment, the control module 220 determines that a train is approaching by analyzing the train schedule. For example, when a train schedule reports that a train is scheduled to pass the railroad crossing in two minutes and the vehicle 100 is one minute away from the railroad crossing, the control module 220 determines that a train is approaching the vehicle 100 at the railroad crossing. In one embodiment, the control module 220 determines that a train is approaching by analyzing the vibration and noise data to identify vibrations/noises associated with an approaching train. As an example, the control module 220, in one configuration, determines that a train is approaching when the control module 220 detects a train horn from a microphone of the vehicle 100 or when sensors of the vehicle 100 indicate that the ground is vibrating at a frequency (e.g., 1 to 100 Hertz (Hz)) corresponding to a train approaching. Further, in one arrangement, the control module 220 may identify an approaching train by analyzing the image/video data to identify characteristics associated with a train in the surrounding environment of the vehicle 100. In any case, responsive to the control module 220 determining that a train is approaching the vehicle 100 at the road crossing, the control module 220 identifies a warning mechanism of the railroad crossing at block 340. Otherwise, responsive to determining that a train is not approaching the vehicle 100 at the road crossing, the control module 220 continues to monitor for railroad crossings and approaching trains as discussed at blocks 310-330.

At 340, the control module 220 identifies a warning mechanism of the railroad crossing and determines a safety condition of the warning mechanism. In one approach, the control module 220 identifies the warning mechanism or lack thereof by analyzing image/video data acquired by the sensors 120. As previously discussed, the control module 220 may employ a machine learning model to extract features about the environment surrounding the vehicle 100 in order to identify the warning mechanism from the image/video data. In one embodiment, the control module 220 correlates features of the image/video data with features indicative of warning mechanisms, such as railroad crossing bars, signs that indicate the presence of a railroad crossings, such as signs with text stating "railroad crossing," "caution," "train," lighting systems of the railroad crossing, and so on to identify the warning mechanism. Further, in one approach, the control module 220 identifies that no warning mechanism is present when the control module 220 does not identify any contextual features of the railroad crossing that correlate to warning mechanisms. In any case, responsive to identifying the warning mechanism, the control module 220, in one embodiment, determines a safety condition of the warning mechanism.

In one arrangement, the control module 220 determines the safety condition of the warning mechanism by identifying a visibility of the warning mechanism, where the visibility of the warning mechanism is based, at least in part, on a FOV of the driver and a position of the warning mechanism along the railroad crossing. The control module 220, in one embodiment, determines the FOV of the driver by analyzing the sensor data 240 associated with a gaze of the driver. For example, based on the eye and head position of the driver, the control module 220 determines whether the warning mechanism is in the FOV of the driver. In one approach, the control module 220 determines the position of the warning mechanism along the railroad crossing by processing and analyzing the sensor data 240 to locate the warning mechanism. Further, in one embodiment, the control module 220 determines the position of the warning mechanism using map data and/or reports from users acquired via a server/network, where the map data and/or reports inform the control module 220 of the location of the warning mechanism along the railroad crossing.

In one arrangement, the control module 220 determines the safety condition of the warning mechanism by determining an availability of the warning mechanism, where the availability is based, at least in part, on a presence of the warning mechanism at the railroad crossing. For example, in one approach, the control module 220 determines whether a warning mechanism is present along the railroad crossing by processing and analyzing sensor data and/or by analyzing reports from users. Additionally, the control module 220, in one embodiment, determines the safety condition of the warning mechanism by determining a functionality a functionality of the warning mechanism, where the functionality is based, at least in part, on a capability of the warning mechanism to output a warning to the road user and a capability of the warning mechanism to execute dynamic movements. In one arrangement, the control module 220 may determine the functionality of the warning mechanism by identifying features of the warning mechanism and comparing the identified features to expected characteristics of the warning mechanism. For example, where the warning mechanism is a crossing bar, the control module 220 may determine the functionality of the crossing bar by determining whether the crossing bar has dimensions that correspond to a typical crossing bar, whether the crossing bar is in an expected position, whether the crossing bar is executing dynamic movements in light of an approaching train, and/or whether the crossing bar is outputting visible warnings in light of an approaching train.

Further, in one embodiment, the control module 220 determines the safety condition of the warning mechanism by determining an accident history of the railroad crossing. In one approach, the control module 220 acquires the accident history from a remote server/network. The accident history may include the frequency of accidents that have occurred at the railroad crossing (e.g., the number of accidents that have occurred in the last day, week, month, year, etc.). Additionally, the control module 220, in one approach, determines the safety condition of the warning mechanism according to the usage history 250. In one embodiment, the control module 220 bases the safety condition of the warning mechanism on the amount of times the vehicle 100 has crossed over the railroad crossing in one direction as defined by the usage history 250. Further, the control module 220 may analyze the usage history 250 to determine the number of times the vehicle 100 has crossed over the railroad crossing in one direction during different weather and daylight conditions.

For example, the control module 220 may determine that the more times the vehicle 100 has crossed the railroad crossing in one direction during the same time of day/weather conditions, the less likely the vehicle 100 is to be cautious at the railroad crossing when driving over the railroad crossing in the same direction and in the presence of the same time of day/weather conditions during future trips (i.e., the less safe the warning mechanism is). In this case, the control module 220 determines that the warning mechanism is likely unsafe due to the familiarity of the vehicle 100 with the railroad crossing. In contrast, the control module 220 may determine that although the vehicle 100 has crossed the railroad crossing many times in the past, because the current weather conditions/time of day/direction of travel do not correlate to past trips of the vehicle 100 over the railroad crossing, the vehicle 100 is likely to have a heightened sense of caution at the railroad crossing, thus rendering the warning mechanism safe.

Additionally, the control module 220, in one arrangement, determines the safety condition by analyzing aspects about the railroad crossing, such as the design of the railroad crossing. In one approach, the control module 220 determines that the curvature of the railroad crossing, the railroad tracks, and/or the road of the vehicle 100 leading to the railroad crossing renders the railroad crossing dangerous as drivers are unlikely to notice approaching trains driving around a sharp curve. For example, if the road leading to the railroad crossing is curved to a degree that renders a warning mechanism outside the FOV of the driver of the vehicle 100, then the control module 220 determines that the safety condition is unsafe/dangerous. As another example, if the railroad tracks are curved to a degree that renders it difficult for the vehicle 100 to see an approaching train until moments before (e.g., five seconds) it crosses over the railroad crossing, the control module 220 determines that the safety condition is unsafe and/or dangerous. As yet another example, if the railroad crossing is curved in a manner that renders an approaching train difficult to perceive by the vehicle 100, then the control module 220 determines that the safety condition is unsafe/dangerous.

In one arrangement, the control module 220 determines the safety condition by analyzing additional factors, such as the amount of foot traffic associated with the railroad crossing and dimensions of the warning mechanism. For example, the control module 220, in one embodiment, determines the safety condition based on an amount of foot traffic over the railroad crossing (e.g., the amount of traveler that cross the railroad crossing daily. As another example, the control module 220 may determine that the warning mechanism is small, short, or otherwise less noticeable due to the dimensions and shape of the warning mechanism, thus rendering the railroad crossing unsafe or dangerous.

At 350, responsive to determining the safety condition of the warning mechanism, the control module 220 determines whether the warning mechanism satisfies a crossing threshold. In one embodiment, the warning mechanism satisfies the crossing threshold when the safety condition correlates to a dangerous and/or unsafe condition. In one approach, the warning mechanism satisfies the crossing threshold when the warning mechanism is outside of the FOV of the road user, the dimensions of the warning mechanism render the warning mechanism unnoticeable, when the warning mechanism is absent from the railroad crossing, when the curvature of the railroad crossing/tracks/road leading to the railroad crossing renders it difficult for road users to see approaching trains, and/or when the warning mechanism is otherwise difficult to identify. Additionally, in one embodiment, the warning mechanism satisfies the crossing threshold when the warning mechanism is broken and/or dysfunctional, such as when the dynamic movements of the warning mechanism are restricted and/or when the warning mechanism fails to output preconfigured warnings.

In one arrangement, the warning mechanism satisfies the crossing threshold when the accident history satisfies a frequency threshold that is based, at least in part, on a frequency of accidents that occur at the railroad crossing. The frequency threshold, in one embodiment, is a frequency of accidents that occur at the railroad crossing which corresponds to the warning mechanism being unsafe and/or dangerous (e.g., ten times a week, month, year, etc.). In one approach, the warning mechanism satisfies the crossing threshold when the usage history 250 satisfies a usage threshold that is based, at least in part, on a frequency of crossing the railroad crossing by the vehicle 100. The usage history 250 is, for example, a frequency of crossing the railroad crossing that correlates to the vehicle 100 potentially acting with a lesser standard of care due to familiarity with the railroad crossing (e.g., three days a week, five days a week, everyday of the week, etc.). The frequency of crossing the railroad crossing, in one approach, further includes the frequency of crossing from different directions, at different times of day, and with different weather conditions. As an example, in one approach, the control module 220 determines that the usage history 250 satisfies the frequency threshold when the vehicle 100 travels over the road crossing at least three days per week, from the same direction, at generally the same time, and during all weather conditions (e.g., in the presence of snow, rain, sunshine, darkness, fog, etc.).

Further, in one embodiment, the warning mechanism satisfies the crossing threshold when foot traffic over the road crossing exceeds a predetermined amount (e.g., when at least twenty pedestrians, animals, cyclists, runner, etc., pass over the railroad crossing). In any case, responsive to the control module 220 determining that the warning mechanism satisfies the crossing threshold, the control module 220 controls a display to output a virtual railroad crossing bar as described at block 360. Otherwise, the control module 220 continues to monitor for railroad crossings, warning mechanisms, and characteristics about warning mechanisms as described at blocks 310-340.

At 360, the control module 220 controls a display of the vehicle 100 to output a virtual railroad crossing bar on the display according to the safety condition. The virtual railroad crossing bar is static or dynamic depending on various factors, such as preferences of the driver, abilities of the display, and so on. In one approach, in addition to outputting a graphic that resembles a crossing bar, the control module 220 controls the display to output text-based warnings, such as "do not cross," "railroad crossing," etc. The text-based warnings may also include other information related to the approaching train, such as the speed of the train, the direction the train is approaching from, the time until the train arrives, and so on.

In one embodiment, the control module 220 controls the display to output the virtual railroad crossing bar at a time that is based, at least in part, on a speed of the vehicle 100. In one approach, the control module 220 directly correlates the commencement of the virtual railroad crossing bar with the speed of the vehicle 100. For example, if the vehicle 100 is traveling fast (e.g., above 30 miles per hour (mph)), then the control module 220 outputs the virtual railroad crossing bar when the vehicle 100 is within a threshold distance of the railroad crossing (e.g., 1 mile). In contrast, if the vehicle 100 is traveling slowly/cautiously (e.g., below 30 mph), then the control module 220 outputs the railroad crossing bar when the vehicle 100 is a closer distance to the railroad crossing (e.g., 0.5 miles from the railroad crossing). Further, in one arrangement, the control module 220 activates brakes of the vehicle 100 to stop the vehicle 100 from traversing the railroad crossing until the train passes the path of the vehicle 100.

In one configuration, the control module 220 varies a visualization of the virtual railroad crossing bar to maintain the gaze of a driver of the vehicle 100 on the virtual railroad crossing bar. As an example, the control module 220 varies the brightness, color, and/or flash pattern of the virtual railroad crossing bar when the control module 220 determines that the eye position of the driver is directed away from the virtual railroad crossing bar. The control module 220, in one embodiment, varies the visual output of the virtual railroad crossing bar based on the severity of distraction of the driver of the vehicle 100. In one approach, the control module 220 outputs a warning at an earlier time than the control module 220 would normally output the virtual railroad crossing bar at and/or output a brighter/higher flash rate virtual railroad crossing bar for highly distracted drivers (e.g., a driver who has not looked at the virtual railroad crossing bar for ten seconds, twenty seconds, etc., a driver who has a tendency to text/use a mobile device while driving, a driver who is multi-tasking, and so on). Further, the control module 220 may control the brightness/flash rate of the virtual railroad crossing bar to increase until the gaze of the driver is directed at the virtual railroad crossing bar.

In one arrangement, the control module 220 varies the output of the virtual railroad crossing bar according to preferences of the driver, where the control module 220 determines the preferences from a driver profile that stores the preferences of the driver and/or from inputs entered by the driver on a human machine interface (HMI) within the vehicle 100. Further, in one embodiment, the control module 220 varies the output of the virtual railroad crossing bar according to characteristics of the driver, such as the age and eyesight of the driver. For example, if the driver is elderly and/or has poor eyesight, the control module 220, in one approach, may vary the output of the virtual railroad crossing bar to be brighter, bigger, and/or more colorful than a default output of the virtual railroad crossing bar.

Moreover, to additionally maintain the attention of the driver, the control module 220, in one embodiment, outputs haptic and/or audible warnings to the vehicle 100. As an example, the driver of the vehicle 100 may receive haptic warnings via steering wheel vibrations, movements in the vehicle seat they are sitting in, and/or other haptic notifications. In one embodiment, the haptic warnings are simulated train vibrations (i.e., vibrations that mimic the vibrations output by the approaching train). The audible warnings may include various audible warnings, such as a beep, chime, and/or simulated train noise (i.e., a noise that mimics the horn of a train). Further, depending on the state of the driver, the control module 220, in one approach, varies the severity of the haptic warnings. For example, the more distracted the driver is, the higher magnitude of haptic warnings the driver receives (e.g., a higher magnitude of movement in the seat, a higher vibration rate in the steering wheel, etc.). Additionally, the control module 220 may vary the volume/sound frequency of audible warnings depending on the driver state. As an example, the more distracted the driver is, the louder the audible warning is presented to the driver.

While the discussion of the control module 220 and method 300 is made with respect to the control module 220 being implemented in the vehicle 100, it should be understood that the control module 220 may be implemented in other devices, such as within a mobile device of a road user (e.g., pedestrian, cyclist, etc.). For example, the control module 220 may identify railroad crossings, warning mechanisms of railroad crossings, safety conditions or warning mechanisms, and approaching trains by acquiring and processing the sensor data 240 on-board a mobile device. Further, in one approach, the control module 220 provides the virtual railroad crossing bar on a screen of a personal device of a road user. Additionally, the control module 220 may output audible/haptic warnings via the mobile device. Further, where the road user is a cyclist or road user that wears a helmet/headphones with speakers or devices to facilitate audible/haptic warnings, the control module 220 outputs audible/haptic warnings via the helmet/headphones. As an example, the control module 220 may control vibration devices of a road user's helmet to emit a simulated train vibration and headphones of a road user to emit a simulated train noise when a train is approaching. In this way, the safety system 170 improves providing a railroad crossing warning to a road user.

Discussion will now continue with reference to FIG. 4 to further describe how a virtual railroad crossing bar can be presented to a driver of a vehicle. FIG. 4 illustrates one embodiment of a virtual railroad crossing warning provided on a display of a vehicle. FIG. 4 will be discussed from the perspective of the safety system 170 of FIGS. 1 and 2. FIG. 4 illustrates a view 400 of a driver of the vehicle 100. The view 400 includes a heads-up display (HUD) 410 integrated into the windshield of the vehicle 100. As previously discussed, responsive to determining that a railroad crossing 420 includes a warning mechanism 430 that satisfies a crossing threshold, the control module 220 controls the HUD 410 to output a virtual railroad crossing bar 440. Although the warning mechanism is illustrated as being broken and thus satisfying the crossing threshold, it should be understood that the control module 220 can determine that the warning mechanism 430 satisfies the crossing threshold in the presence of other safety conditions associated with the warning mechanism 430, such as the warning mechanism 430 being outside the FOV of the driver, the warning mechanism 430 being absent from the railroad crossing 420, and so on. Further, although the virtual railroad crossing bar 440 is illustrated as a static graphic, it should be understood that the virtual railroad crossing bar 440 may be dynamic, be output in varying colors, be output as a different shape/image, be output with different textual warnings, and so on. In this way, the safety system 170 improves railroad crossing warnings for road users.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As used herein, "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and application specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the safety system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the safety system 170, and/or the autonomous driving module(s) 160 may control some or all of the vehicle systems 140 and, thus, may be partially or fully autonomous as defined by SAE 0 to 5.

The processor(s) 110, the safety system 170, and/or the autonomous driving module(s) 160 can be operatively connected to communicate with the various vehicle systems 140 and/or individual components thereof. For example, returning to FIG. 1, the processor(s) 110, the safety system 170, and/or the autonomous driving module(s) 160 can be in communication to send and/or receive information from the various vehicle systems 140 to control the movement of the vehicle 100. The processor(s) 110, the safety system 170, and/or the autonomous driving module(s) 160 may control some or all of the vehicle systems 140.

The processor(s) 110, the safety system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the safety system 170, and/or the autonomous driving module(s) 160 can control the direction and/or speed of the vehicle 100. The processor(s) 110, the safety system 170, and/or the autonomous driving module(s) 160 can cause the vehicle 100 to accelerate, decelerate and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be element or combination of elements operable to alter one or more of the vehicle systems 140 or components thereof to responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One of more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the safety system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240 as implemented by the control module 220. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A safety system comprising:
one or more processors; and
a memory communicably coupled to the one or more processors and storing instructions that, when executed by the one or more processors, cause the one or more processors to:
identify a railroad crossing in a path of a road user;
responsive to determining that a train is approaching the road user at the railroad crossing, determine whether a warning mechanism of the railroad crossing satisfies a crossing threshold that is based, at least in part, on a safety condition of the warning mechanism; and
control a display of the road user to output a virtual railroad crossing bar on the display according to the safety condition responsive to determining that the warning mechanism satisfies the crossing threshold, wherein the safety system is implemented within a user device of the road user.

2. The safety system of claim 1, wherein the instructions to determine whether the warning mechanism satisfies the crossing threshold include instructions to determine whether:
the warning mechanism is outside of a field of view of the road user,
dynamic movements of the warning mechanism are restricted, and
the warning mechanism is absent from the railroad crossing.

3. The safety system of claim 1, wherein the instructions to determine whether the warning mechanism satisfies the crossing threshold include instructions to determine:
a visibility of the warning mechanism, wherein the visibility of the warning mechanism is based, at least in part, on a field of view of the road user and a position of the warning mechanism along the railroad crossing, and
an availability of the warning mechanism, wherein the availability is based, at least in part, on a presence of the warning mechanism at the railroad crossing.

4. The safety system of claim 1, wherein the instructions to identify the railroad crossing include instructions to use sensors of the user device to acquire sensor data and process the sensor data to perceive the railroad crossing,
wherein the instructions to determine whether the warning mechanism satisfies the crossing threshold includes instructions to determine a functionality of the warning mechanism, wherein the functionality is based, at least in part, on a capability of the warning mechanism to output a warning to the road user and a capability of the warning mechanism to execute dynamic movements.

5. The safety system of claim 1, wherein the safety condition includes an accident history of the railroad crossing, and
wherein the instructions to determine that the warning mechanism satisfies the crossing threshold include instructions to determine that the accident history of the railroad crossing satisfies a frequency threshold that is based, at least in part, on a frequency of accidents that occur at the railroad crossing.

6. The safety system of claim 1, wherein the instructions to control the display include instructions to at least one of:
control the display to output the virtual railroad crossing bar at a time that is based, at least in part, on a speed of the road user, and
vary a visualization of the virtual railroad crossing bar to maintain a gaze of the road user on the virtual railroad crossing bar.

7. The safety system of claim 1, wherein the road user is a vehicle, and further including instructions to activate brakes of the vehicle to stop the vehicle from moving until the train passes the path of the vehicle.

8. The safety system of claim 1, wherein the safety condition includes a usage history of the railroad crossing by the road user, and
wherein the instructions to determine whether the warning mechanism satisfies the crossing threshold include instructions to determine that the usage history of the road user satisfies a usage threshold that is based, at least in part, on a frequency of crossing the railroad crossing by the road user.

9. A non-transitory computer-readable medium including instructions that when executed by one or more processors cause the one or more processors to:
identify, by a user device of a road user, a railroad crossing in a path of the road user;
responsive to determining, by the user device, that a train is approaching the road user at the railroad crossing, determine, by the user device, whether a warning mechanism of the railroad crossing satisfies a crossing threshold that is based, at least in part, on a safety condition of the warning mechanism; and
control, by the user device, a display of the road user to output a virtual railroad crossing bar on the display according to the safety condition responsive to determining that the warning mechanism satisfies the crossing threshold.

10. The non-transitory computer-readable medium of claim 9, wherein the instructions to determine that the warning mechanism satisfies the crossing threshold includes instructions to determine whether:
the warning mechanism is outside of a field of view of the road user,
dynamic movements of the warning mechanism are restricted, and
the warning mechanism is absent from the railroad crossing.

11. The non-transitory computer-readable medium of claim 9, wherein the instructions to determine whether the warning mechanism satisfies the crossing threshold include instructions to determine:
a visibility of the warning mechanism, wherein the visibility of the warning mechanism is based, at least in part, on a field of view of the road user and a position of the warning mechanism along the railroad crossing, and
an availability of the warning mechanism, wherein the availability is based, at least in part, on a presence of the warning mechanism at the railroad crossing.

12. The non-transitory computer-readable medium of claim 9, wherein the instructions to determine whether the warning mechanism satisfies the crossing threshold includes instructions to determine a functionality of the warning mechanism, wherein the functionality is based, at least in part, on a capability of the warning mechanism to output a warning to the road user and a capability of the warning mechanism to execute dynamic movements.

13. The non-transitory computer-readable medium of claim 9, wherein the safety condition includes an accident history of the railroad crossing, and
   wherein the instructions to determine that the warning mechanism satisfies the crossing threshold include instructions to determine that the accident history of the railroad crossing satisfies a frequency threshold that is based, at least in part, on a frequency of accidents that occur at the railroad crossing.

14. A method, comprising:
   identifying, by a user device of a road user, a railroad crossing in a path of the road user;
   in response to determining, by the user device, that a train is approaching the road user at the railroad crossing, determining, by the user device, whether a warning mechanism of the railroad crossing satisfies a crossing threshold that is based, at least in part, on a safety condition of the warning mechanism; and
   controlling, by the user device, a display of the road user to output a virtual railroad crossing bar on the display according to the safety condition responsive to determining that the warning mechanism satisfies the crossing threshold.

15. The method of claim 14, wherein determining whether the warning mechanism satisfies the crossing threshold includes determining whether:
   the warning mechanism is outside of field of view of the road user,
   dynamic movements of the warning mechanism are restricted, and
   the warning mechanism is absent from the railroad crossing.

16. The method of claim 14, wherein determining whether the warning mechanism satisfies the crossing threshold includes determining:
   a visibility of the warning mechanism, wherein the visibility of the warning mechanism is based, at least in part, on a field of view of the road user and a position of the warning mechanism along the railroad crossing, and
   an availability of the warning mechanism, wherein the availability is based, at least in part, on a presence of the warning mechanism at the railroad crossing.

17. The method of claim 14, wherein determining whether the warning mechanism satisfies the crossing threshold includes determining a functionality of the warning mechanism, wherein the functionality is based, at least in part, on a capability of the warning mechanism to output a warning to the road user and a capability of the warning mechanism to execute dynamic movements.

18. The method of claim 14, wherein the safety condition includes an accident history of the railroad crossing, and
   wherein determining that the warning mechanism satisfies the crossing threshold includes determining that the accident history of the railroad crossing satisfies a frequency threshold that is based, at least in part, on a frequency of accidents that occur at the railroad crossing.

19. The method of claim 14,
   wherein controlling the display includes at least one of:
   controlling the display to output the virtual railroad crossing bar at a time that is based, at least in part, on a speed of the road user, and varying a visualization of the virtual railroad crossing bar to maintain a gaze of the road user on the virtual railroad crossing bar.

20. The method of claim 14, wherein the road user is a vehicle, and further comprising:
   activating brakes of the vehicle to stop the vehicle from moving until the train passes the path of the vehicle.

\* \* \* \* \*